United States Patent
Ben Dayan et al.

(10) Patent No.: US 11,736,561 B2
(45) Date of Patent: *Aug. 22, 2023

(54) LOAD BALANCED NETWORK FILE ACCESSES

(71) Applicant: Weka.IO Ltd, Tel Aviv (IL)

(72) Inventors: Maor Ben Dayan, Tel Aviv (IL); Omri Palmon, Tel Aviv (IL); Liran Zvibel, Tel Aviv (IL)

(73) Assignee: Weka.IO Ltd.

( * ) Notice: Subject to any disclaimer, the term of this patent is extended or adjusted under 35 U.S.C. 154(b) by 0 days.

This patent is subject to a terminal disclaimer.

(21) Appl. No.: 17/402,834

(22) Filed: Aug. 16, 2021

(65) Prior Publication Data

US 2021/0377337 A1 Dec. 2, 2021

Related U.S. Application Data

(63) Continuation of application No. 15/922,997, filed on Mar. 16, 2018, now Pat. No. 11,108,852, which is a continuation of application No. 15/427,510, filed on Feb. 8, 2017, now Pat. No. 9,948,705, which is a continuation of application No. 14/938,468, filed on Nov. 11, 2015, now Pat. No. 9,699,244.

(51) Int. Cl.

| | |
|---|---|
| *G06F 3/00* | (2006.01) |
| *H04L 67/1008* | (2022.01) |
| *H04L 69/40* | (2022.01) |
| *G06F 16/182* | (2019.01) |
| *H04L 61/5007* | (2022.01) |

(Continued)

(52) U.S. Cl.
CPC ........ *H04L 67/1008* (2013.01); *G06F 16/182* (2019.01); *H04L 43/0852* (2013.01); *H04L 43/0882* (2013.01); *H04L 61/5007* (2022.05); *H04L 67/06* (2013.01); *H04L 67/101* (2013.01); *H04L 67/1029* (2013.01);

(Continued)

(58) Field of Classification Search
CPC . G06F 13/38; G06F 21/6218; H04L 67/1097; H04L 63/10
USPC .......................................................... 710/68
See application file for complete search history.

(56) References Cited

U.S. PATENT DOCUMENTS

| | | | |
|---|---|---|---|
| 7,209,967 B2 * | 4/2007 | Kitamura | G06F 3/0647 709/225 |
| 8,578,053 B2 * | 11/2013 | Shinkai | H04L 67/1001 709/239 |

(Continued)

OTHER PUBLICATIONS

Extended European Search Report Appln. 16863737.9 dated Mar. 26, 2019 (9 pages).

(Continued)

*Primary Examiner* — Titus Wong
(74) *Attorney, Agent, or Firm* — McAndrews, Held & Malloy, Ltd.

(57) ABSTRACT

A system comprises control circuitry that is operable to assign a first of a plurality of computing devices to serve file system requests destined for any of a first plurality of network addresses; assign a second of the computing devices to serve file system requests destined for any of a second plurality of network addresses; maintain statistics regarding file system requests sent to each of the first plurality of network addresses and the second plurality of network addresses; and reassign, based on the statistics, the first of the computing devices to serve file system requests destined for a selected one of the second plurality of network addresses.

20 Claims, 17 Drawing Sheets

(51) Int. Cl.
*H04L 67/06* (2022.01)
*H04L 67/1097* (2022.01)
*H04L 43/0852* (2022.01)
*H04L 43/0882* (2022.01)
*H04L 67/101* (2022.01)
*H04L 67/1029* (2022.01)
*H04L 101/668* (2022.01)

(52) U.S. Cl.
CPC .......... *H04L 67/1097* (2013.01); *H04L 69/40* (2013.01); *H04L 2101/668* (2022.05)

(56) References Cited

U.S. PATENT DOCUMENTS

| | | | | |
|---|---|---|---|---|
| 8,719,445 | B2 * | 5/2014 | Ko | H04L 63/168 |
| | | | | 709/236 |
| 8,918,475 | B2 | 12/2014 | Ozzie et al. | |
| 9,699,244 | B2 | 7/2017 | Ben Dayan et al. | |
| 9,948,705 | B2 | 4/2018 | Ben Dayan et al. | |
| 2003/0126252 | A1 * | 7/2003 | Abir | H04L 63/1458 |
| | | | | 709/223 |
| 2009/0172666 | A1 * | 7/2009 | Yahalom | H04L 43/0876 |
| | | | | 718/1 |
| 2013/0073717 | A1 | 3/2013 | Collin et al. | |
| 2013/0103787 | A1 * | 4/2013 | Glover | G06F 9/5083 |
| | | | | 709/217 |
| 2013/0301413 | A1 * | 11/2013 | Moen | H04L 67/1001 |
| | | | | 370/235 |

OTHER PUBLICATIONS

Int'l Search Report and Written Opinion for PCT/IB16/001357 dated Feb. 2, 2017 (14 pages).

Int'l Preliminary Report on Patentability for PCT/IB16/001357 dated May 24, 2018 (9 pages).

Extended European Search Report Appln. 20217036.1 dated Jul. 1, 2021 (7 pages).

* cited by examiner

LOAD BALANCED NETWORK FILE ACCESSES

CROSS-REFERENCE TO RELATED APPLICATIONS/INCORPORATION BY REFERENCE

This application is a continuation of U.S. patent application Ser. No. 15/922,997, filed Mar. 16, 2018, which is a continuation of U.S. patent application Ser. No. 15/427,510, filed Feb. 8, 2017 (now U.S. Pat. No. 9,948,705), which is a continuation of U.S. patent application Ser. No. 14/938,468, filed Nov. 11, 2015 (now U.S. Pat. No. 9,699,244). The above-referenced documents are hereby incorporated herein by reference in their its entirety.

BACKGROUND

Limitations and disadvantages of conventional approaches to data storage will become apparent to one of skill in the art, through comparison of such approaches with some aspects of the present method and system set forth in the remainder of this disclosure with reference to the drawings.

BRIEF SUMMARY

Methods and systems are provided for load balanced network file accesses substantially as illustrated by and/or described in connection with at least one of the figures, as set forth more completely in the claims.

DETAILED DESCRIPTION

Figure 1:
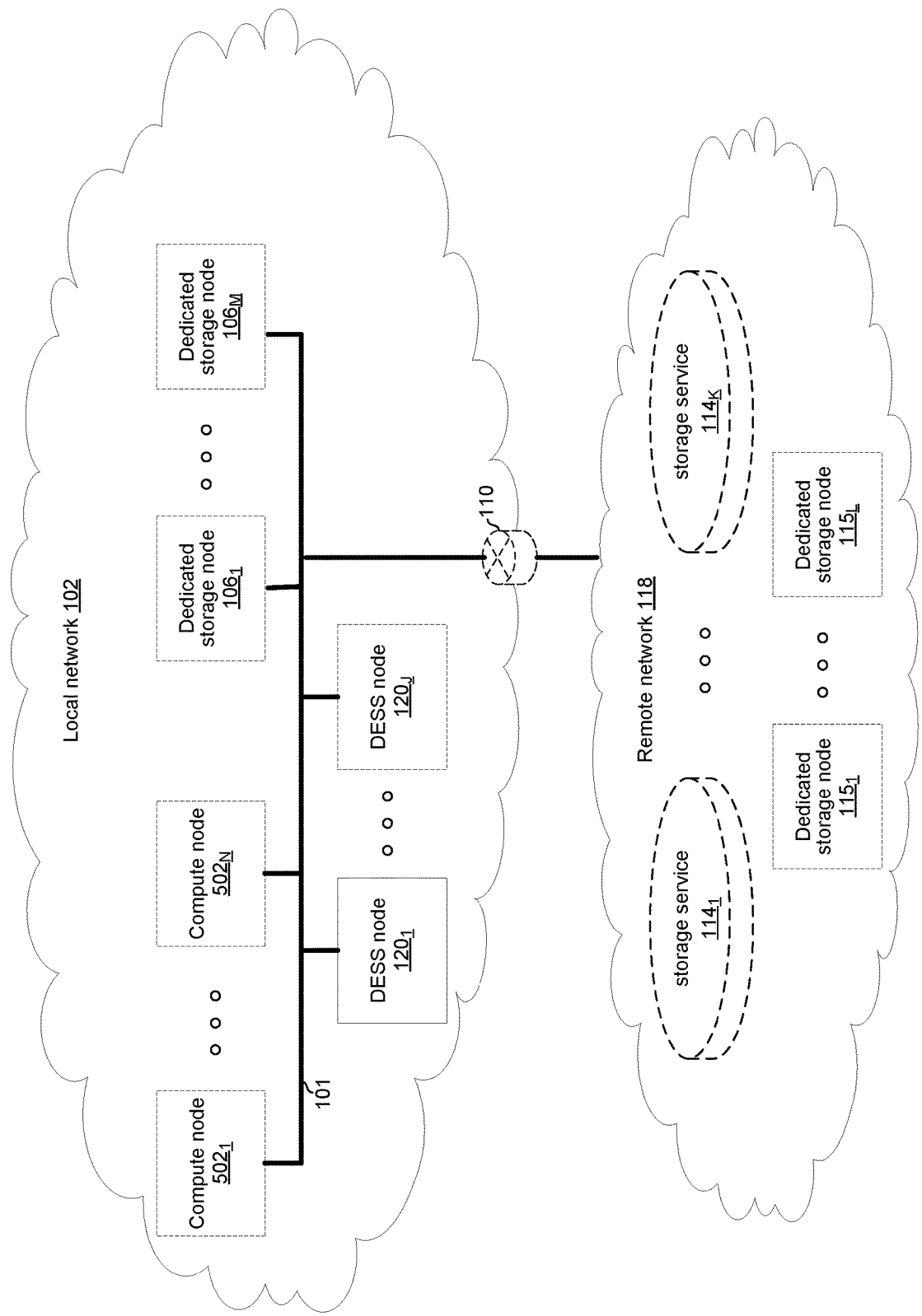
FIG. 1 illustrates various example configurations of a distributed electronic storage system in accordance with aspects of this disclosure.

FIG. 1 illustrates various example configurations of a distributed electronic storage system in accordance with aspects of this disclosure. Shown in FIG. 1 is a local area network (LAN) 102 comprising one or more virtual distributed electronic storage system (DESS) nodes 120 (indexed by integers from 1 to J, for $j \geq 1$), and optionally comprising (indicated by dashed lines): one or more dedicated storage nodes 106 (indexed by integers from 1 to M, for $M \geq 1$), one or more compute nodes 104 (indexed by integers from 1 to N, for $N \geq 1$), and/or an edge router that connects the LAN 102 to a remote network 118. The remote network 118 optionally comprises one or more storage services 114 (indexed by integers from 1 to K, for $K \geq 1$), and/or one or more dedicated storage nodes 115 (indexed by integers from 1 to L, for $L \geq 1$). The nodes of the LAN 102 are communicatively coupled via interconnect 101 (e.g., copper cables, fiber cables, wireless links, switches, bridges, hubs, and/or the like).

Each compute node $104_n$ (n an integer, where $1 \leq n \leq N$) is a networked computing device (e.g., a server, personal computer, or the like) that comprises circuitry for running a variety of client processes (either directly on an operating system of the device $104_n$ and/or in one or more virtual machines/containers running in the device $104_n$) and for interfacing with one or more DESS nodes 120. As used in this disclosure, a "client process" is a process that reads data from storage and/or writes data to storage in the course of performing its primary function, but whose primary function is not storage-related (i.e., the process is only concerned that its data is reliable stored and retrievable when needed, and not concerned with where, when, or how the data is stored). Example applications which give rise to such processes include: an email server application, a web server application, office productivity applications, customer relationship management (CRM) applications, and enterprise resource planning (ERP) applications, just to name a few. Example configurations of a compute node $104_n$ are described below with reference to FIG. 2.

Each DESS node $120_j$ (j an integer, where $1 \leq j \leq J$) is a networked computing device (e.g., a server, personal computer, or the like) that comprises circuitry for running DESS processes and, optionally, client processes (either directly on an operating system of the device $104_n$ and/or in one or more virtual machines running in the device $104_n$). As used in this disclosure, a "DESS process" is a process that implements one or more of: the DESS driver, the DESS front end, the DESS back end, and the DESS memory controller described below in this disclosure. Example configurations of a DESS node $120_j$ are described below with reference to FIG. 3. Thus, in an example implementation, resources (e.g., processing and memory resources) of the DESS node $120_j$ may be shared among client processes and DESS processes. The processes of the DESS may be configured to demand relatively small amounts of the resources to minimize the impact on the performance of the client applications. From the perspective of the client process(es), the interface with the DESS may be independent of the particular physical machine(s) on which the DESS process(es) are running.

Each on-premises dedicated storage node $106_m$ (m an integer, where $1 \leq m \leq M$) is a networked computing device and comprises one or more storage devices and associated circuitry for making the storage device(s) accessible via the LAN 102. An example configuration of a dedicated storage node $106_m$ is described below with reference to FIG. 4.

Each storage service $114_k$ (k an integer, where $1 \leq k \leq K$) may be a cloud-based service such as Amazon S3, Microsoft Azure, Google Cloud, Rackspace, Amazon Glacier, and Google Nearline.

Each remote dedicated storage node $115_l$ (l an integer, where $1 \leq l \leq L$) may be similar to, or the same as, an on-premises dedicated storage node 106. In an example implementation, a remote dedicated storage node $115_l$ may store data in a different format and/or be accessed using different protocols than an on-premises dedicated storage node 106 (e.g., HTTP as opposed to Ethernet-based or RDMA-based protocols).

Figure 2:
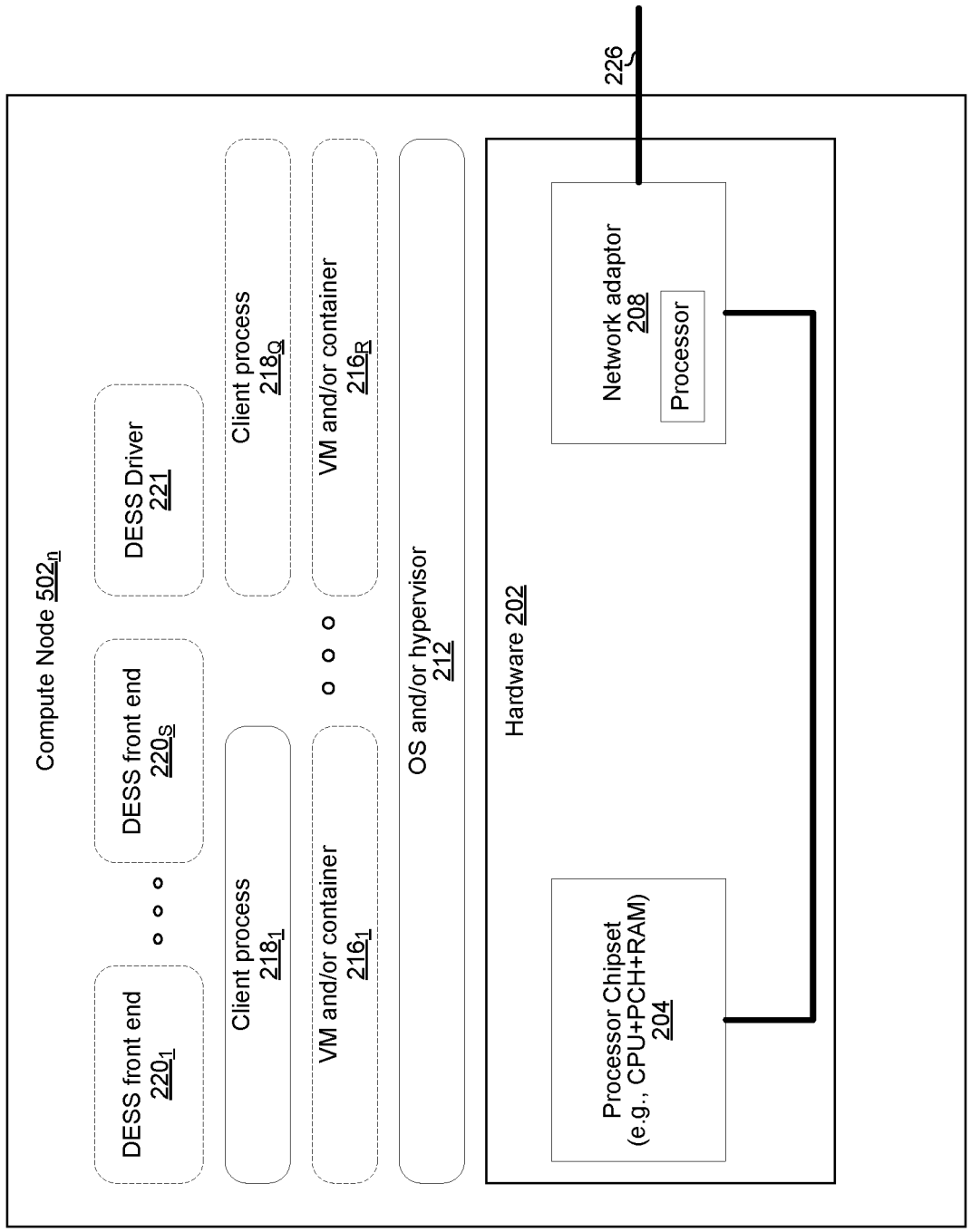
FIG. 2 illustrates various example configurations of a compute node that uses a distributed electronic storage system in accordance with aspects of this disclosure.

FIG. 2 illustrates various example configurations of a compute node that uses a DESS in accordance with aspects of this disclosure. The example compute node $104_n$ comprises hardware 202 that, in turn, comprises a processor chipset 204 and a network adaptor 208.

The processor chipset 204 may comprise, for example, an x86-based chipset comprising a single or multi-core processor system on chip, one or more RAM ICs, and a platform controller hub IC. The chipset 204 may comprise one or more bus adaptors of various types for connecting to other components of hardware 202 (e.g., PCIe, USB, SATA, and/or the like).

The network adaptor 208 may, for example, comprise circuitry for interfacing to an Ethernet-based and/or RDMA-based network. In an example implementation, the network adaptor 208 may comprise a processor (e.g., an ARM-based processor) and one or more of the illustrated software components may run on that processor. The network adaptor 208 interfaces with other members of the LAN 100 via (wired, wireless, or optical) link 226. In an example implementation, the network adaptor 208 may be integrated with the chipset 204.

Software running on the hardware 202 includes at least: an operating system and/or hypervisor 212, one or more client processes 218 (indexed by integers from 1 to Q, for $Q \geq 1$) and one or both of: a DESS driver 221 and DESS front end 220. Additional software that may optionally run on the compute node $104_n$ includes: one or more virtual machines (VMs) and/or containers 216 (indexed by integers from 1 to R, for $R \geq 1$).

Each client process $218_q$ (q an integer, where $1 \leq q \leq Q$) may run directly on an operating system/hypervisor 212 or may run in a virtual machine and/or container $216_r$ (r an integer, where $1 \leq r \leq R$) serviced by the OS and/or hypervisor 212. Each client processes 218 is a process that reads data from storage and/or writes data to storage in the course of performing its primary function, but whose primary function is not storage-related (i.e., the process is only concerned that its data is reliably stored and is retrievable when needed, and not concerned with where, when, or how the data is stored). Example applications which give rise to such processes include: an email server application, a web server application, office productivity applications, customer relationship management (CRM) applications, and enterprise resource planning (ERP) applications, just to name a few.

The DESS driver 221 is operable to receive/intercept local file system commands (e.g., POSIX commands) and generate corresponding file system requests (e.g., read, write, create, make directory, remove, remove directory, link, etc.) to be transmitted onto the interconnect 101. In some instances, the file system requests transmitted on the interconnect 101 may be of a format customized for use with the DESS front end 220 and/or DESS back end 222 described herein. In some instances, the file system requests transmitted on the interconnect 101 may adhere to a standard such as Network File System (NFS), Server Message Block (DMB), Common Internet File System (CIFS), and/or the like.

Each DESS front end instance $220_s$ (s an integer, where $1 \leq s \leq S$ if at least one front end instance is present on compute node $104_n$) provides an interface for routing file system requests to an appropriate DESS back end instance (running on a DESS node), where the file system requests may originate from one or more of the client processes 218, one or more of the VMs and/or containers 216, and/or the OS and/or hypervisor 212. Each DESS front end instance $220_s$ may run on the processor of chipset 204 or on the processor of the network adaptor 208. For a multi-core processor of chipset 204, different instances of the DESS front end 220 may run on different cores.

Figure 3:
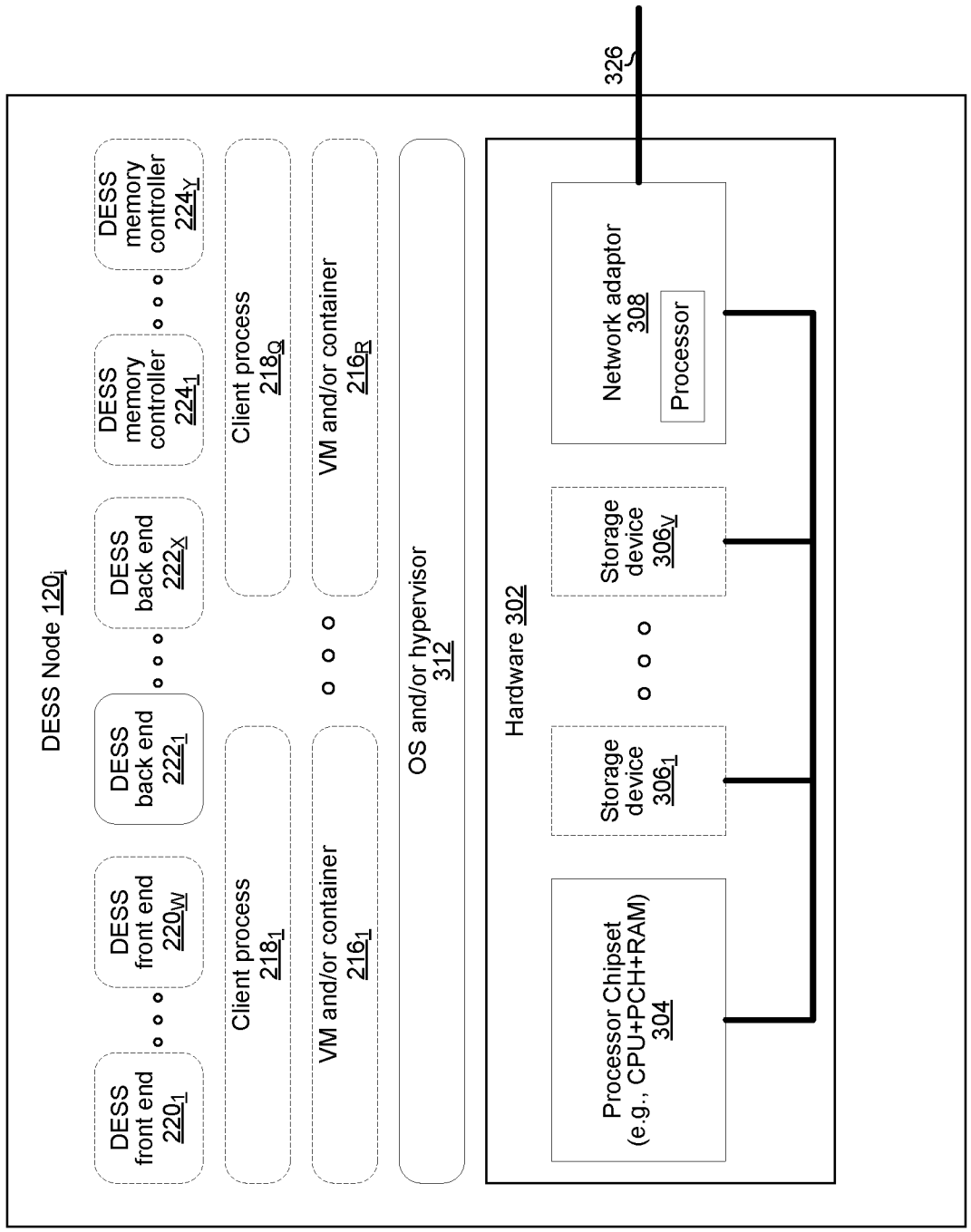
FIG. 3 illustrates various example configurations of a dedicated distributed electronic storage system node in accordance with aspects of this disclosure.

FIG. 3 shows various example configurations of a dedicated distributed electronic storage system node in accordance with aspects of this disclosure. The example DESS node $120_j$ comprises hardware 302 that, in turn, comprises a processor chipset 304, a network adaptor 308, and, optionally, one or more storage devices 306 (indexed by integers from 1 to W, for $W \geq 1$).

Each storage device $306_p$ (p an integer, where $1 \leq p \leq P$ if at least one storage device is present) may comprise any suitable storage device for realizing a tier of storage that it is desired to realize within the DESS node $120_j$.

The processor chipset 304 may be similar to the chipset 204 described above with reference to FIG. 2. The network adaptor 308 may be similar to the network adaptor 208 described above with reference to FIG. 2 and may interface with other nodes of LAN 100 via link 326.

Software running on the hardware 302 includes at least: an operating system and/or hypervisor 212, and at least one of: one or more instances of DESS front end 220 (indexed by integers from 1 to W, for $W \geq 1$), one or more instances of DESS back end 222 (indexed by integers from 1 to X, for $X \geq 1$), and one or more instances of DESS memory controller 224 (indexed by integers from 1 to Y, for $Y \geq 1$). Additional software that may optionally run on the hardware 302 includes: one or more virtual machines (VMs) and/or containers 216 (indexed by integers from 1 to R, for $R \geq 1$), and/or one or more client processes 318 (indexed by integers from 1 to Q, for $Q \geq 1$). Thus, as mentioned above, DESS processes and client processes may share resources on a DESS node and/or may reside on separate nodes.

The client processes 218 and VM(s) and/or container(s) 216 may be as described above with reference to FIG. 2.

Each DESS front end instance $220_w$ (w an integer, where $1 \leq w \leq W$ if at least one front end instance is present on DESS node $120_j$) provides an interface for routing file system requests to an appropriate DESS back end instance (running on the same or a different DESS node), where the file system requests may originate from one or more of the client processes 218, one or more of the VMs and/or containers 216, and/or the OS and/or hypervisor 212. Each DESS front end instance $220_w$ may run on the processor of chipset 304 or on the processor of the network adaptor 308. For a multi-core processor of chipset 304, different instances of the DESS front end 220 may run on different cores.

Each DESS back end instance $222_x$ (x an integer, where $1 \leq x \leq X$ if at least one back end instance is present on DESS node $120_j$) services the file system requests that it receives and carries out tasks to otherwise manage the DESS (e.g., load balancing, journaling, maintaining metadata, caching, moving of data between tiers, removing stale data, correcting corrupted data, etc.) Each DESS back end instance $222_x$ may run on the processor of chipset 304 or on the processor of the network adaptor 308. For a multi-core processor of chipset 304, different instances of the DESS back end 222 may run on different cores.

Each DESS memory controller instance $224_u$ (u an integer, where $1 \le u \le U$ if at least DESS memory controller instance is present on DESS node $120_j$) handles interactions with a respective storage device 306 (which may reside in the DESS node 120j or another DESS node 120 or a storage node 106). This may include, for example, translating addresses, and generating the commands that are issued to the storage device (e.g., on a SATA, PCIe, or other suitable bus). Thus, the DESS memory controller instance $224_u$ operates as an intermediary between a storage device and the various DESS back end instances of the DESS.

Figure 4:
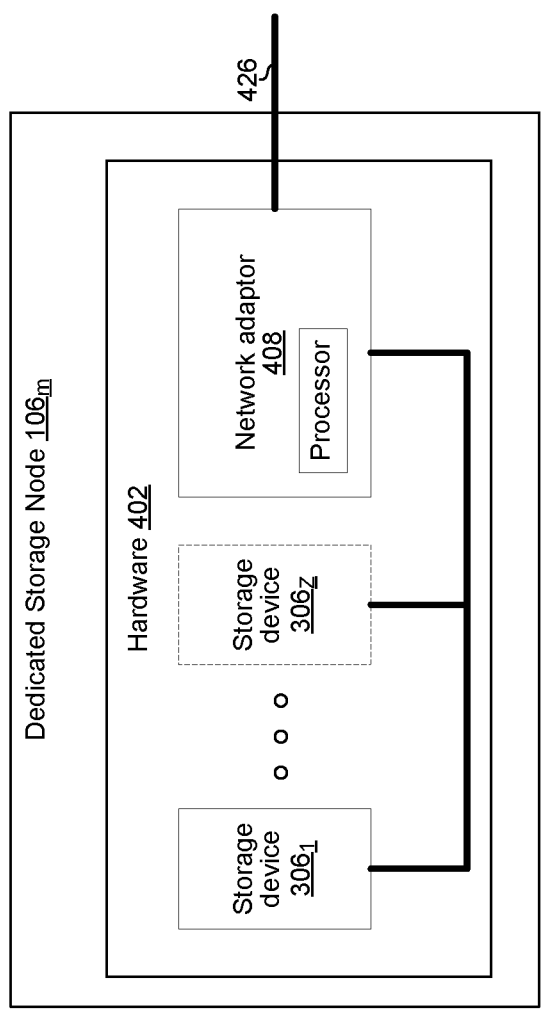
FIG. 4 illustrates various example configurations of a dedicated storage node in accordance with aspects of this disclosure.

FIG. 4 illustrates various example configurations of a dedicated storage node in accordance with aspects of this disclosure. The example dedicated storage node $106_m$ comprises hardware 402 which, in turn, comprises a network adaptor 408 and at least one storage device 306 (indexed by integers from 1 to Z, for $Z \ge 1$). Each storage device $306_z$ may be the same as storage device $306_w$ described above with reference to FIG. 3. The network adaptor 408 may comprise circuitry (e.g., an arm based processor) and a bus (e.g., SATA, PCIe, or other) adaptor operable to access (read, write, etc.) storage device(s) $406_1$-$406_Z$ in response to commands received over network link 426. The commands may adhere to a standard protocol. For example, the dedicated storage node $106_m$ may support RDMA based protocols (e.g., Infiniband, RoCE, iWARP etc.) and/or protocols which ride on RDMA (e.g., NVMe over fabrics).

In an example implementation, tier 1 memory is distributed across one or more storage devices 306 (e.g., FLASH devices) residing in one or more storage node(s) 106 and/or one or more DESS node(s) 120. Data written to the DESS is initially stored to Tier 1 memory and then migrated to one or more other tier(s) as dictated by data migration policies, which may be user-defined and/or adaptive based on machine learning.

Figure 5A:
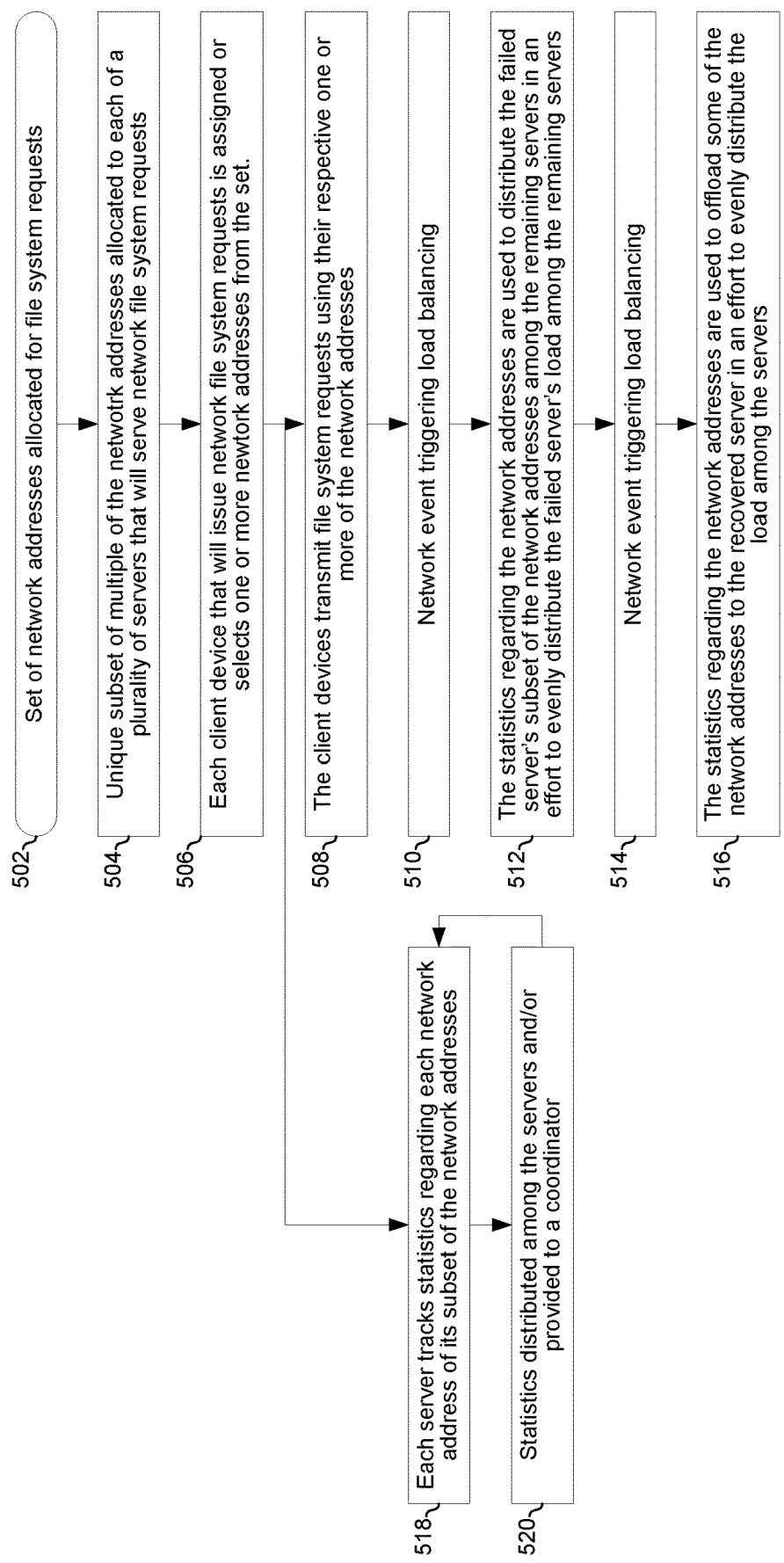
FIG. 5A is a flowchart of an example process for load balancing the handling of file system requests in accordance with aspects of this disclosure.

FIG. 5A is a flowchart of an example process for load balancing the handling of file system requests in accordance with aspects of this disclosure. The process is described with reference to FIGS. 5B-5D which depict a plurality (three in the non-limiting example shown) of computing devices 554 which operate as file system servers to server file system requests transmitted over the interconnect 101 by a plurality (nine in the non-limiting example shown) of computing devices 552 which operate as file system clients.

Each of the computing devices 552 comprises an instance of driver 221. Each instance of driver 221 is configured to send file system requests (e.g., transmitted in accordance with NFS and/or SMB standards) to the network address (an IPv4 address in the non-limiting example shown) stored in a its respective memory address 560.

Figure 5B:
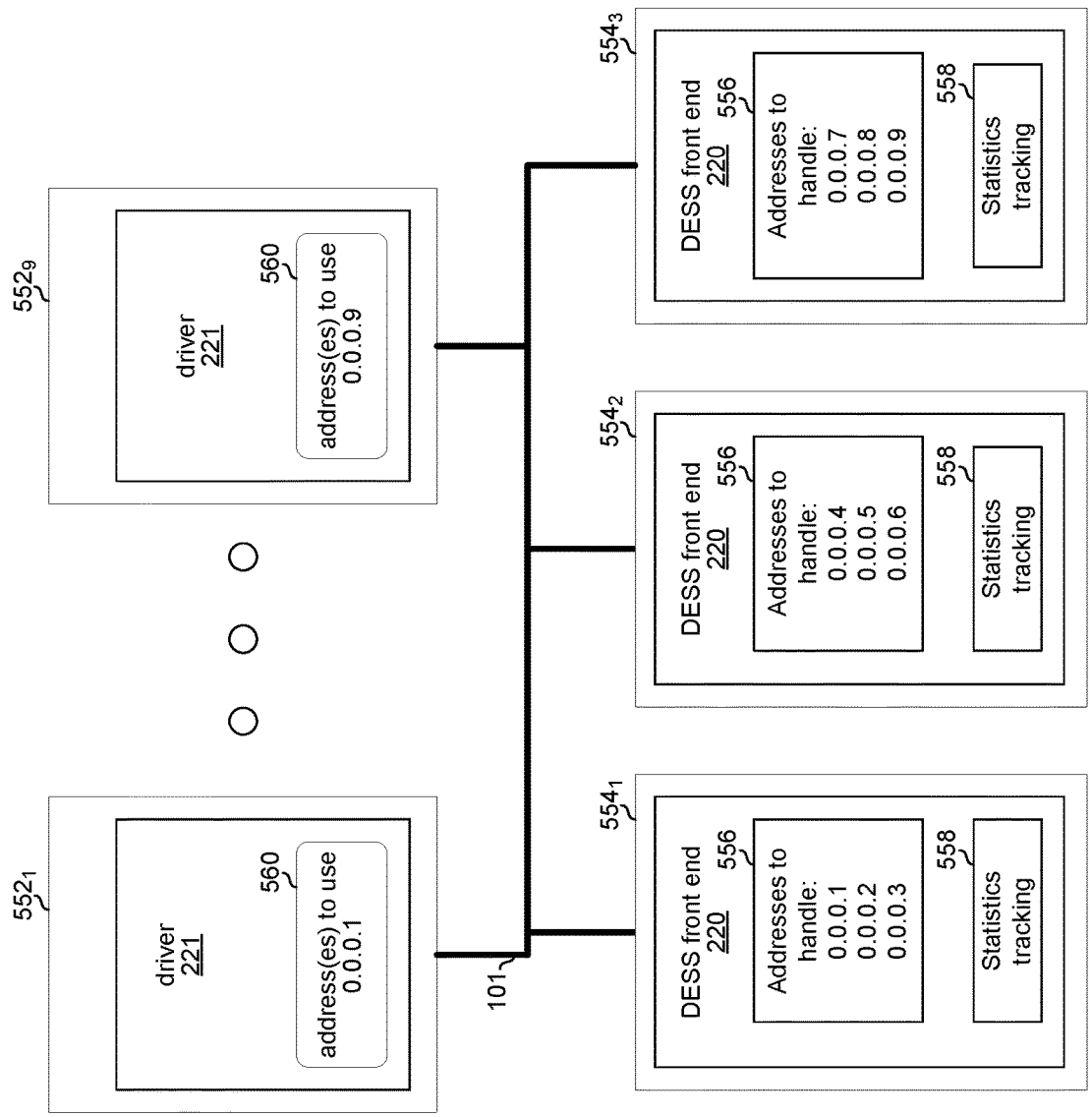
FIG. 5B-5D illustrate an example DESS during the process of FIG. 5A.
Figure 5C:
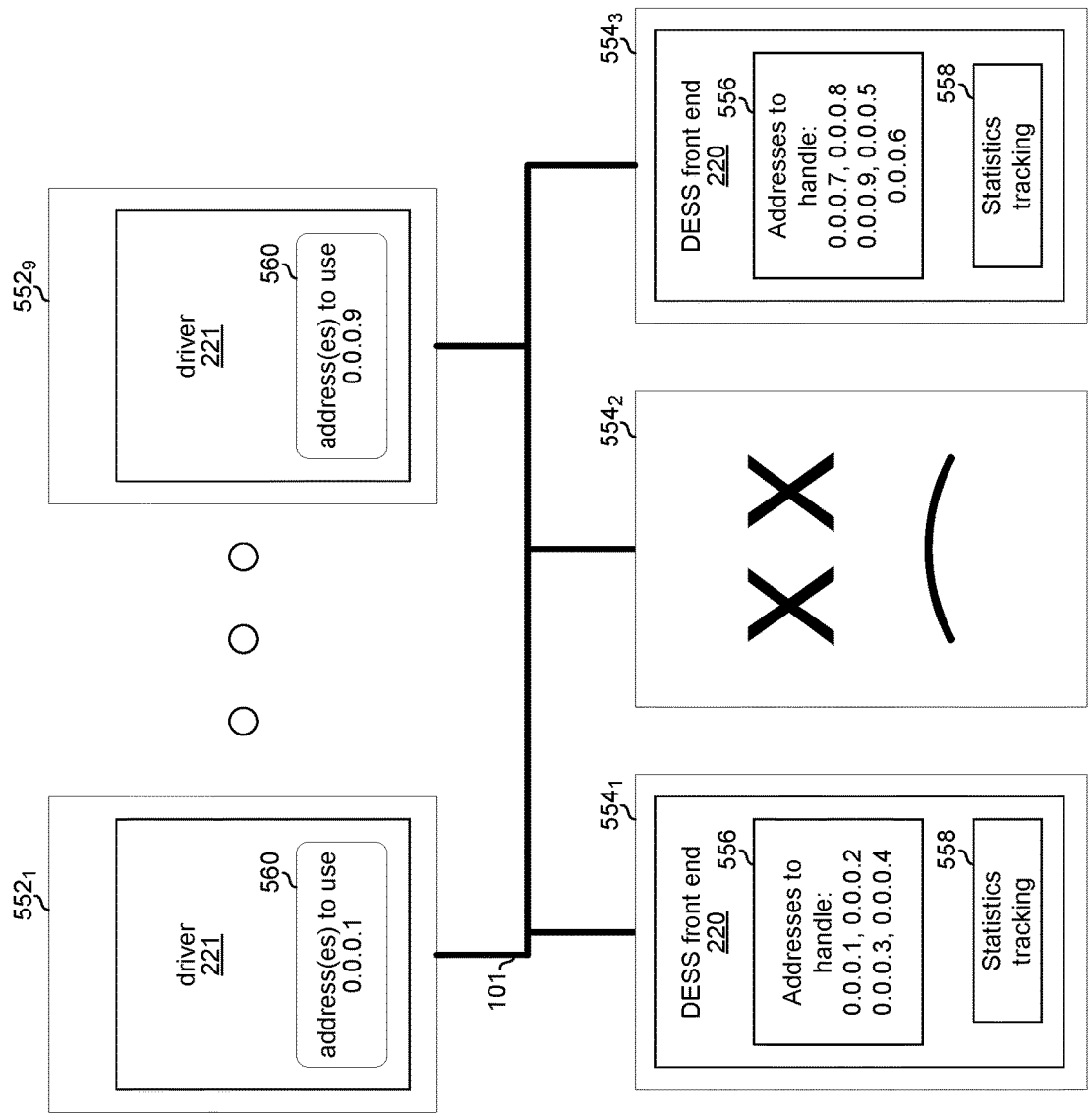
Figure 5D:
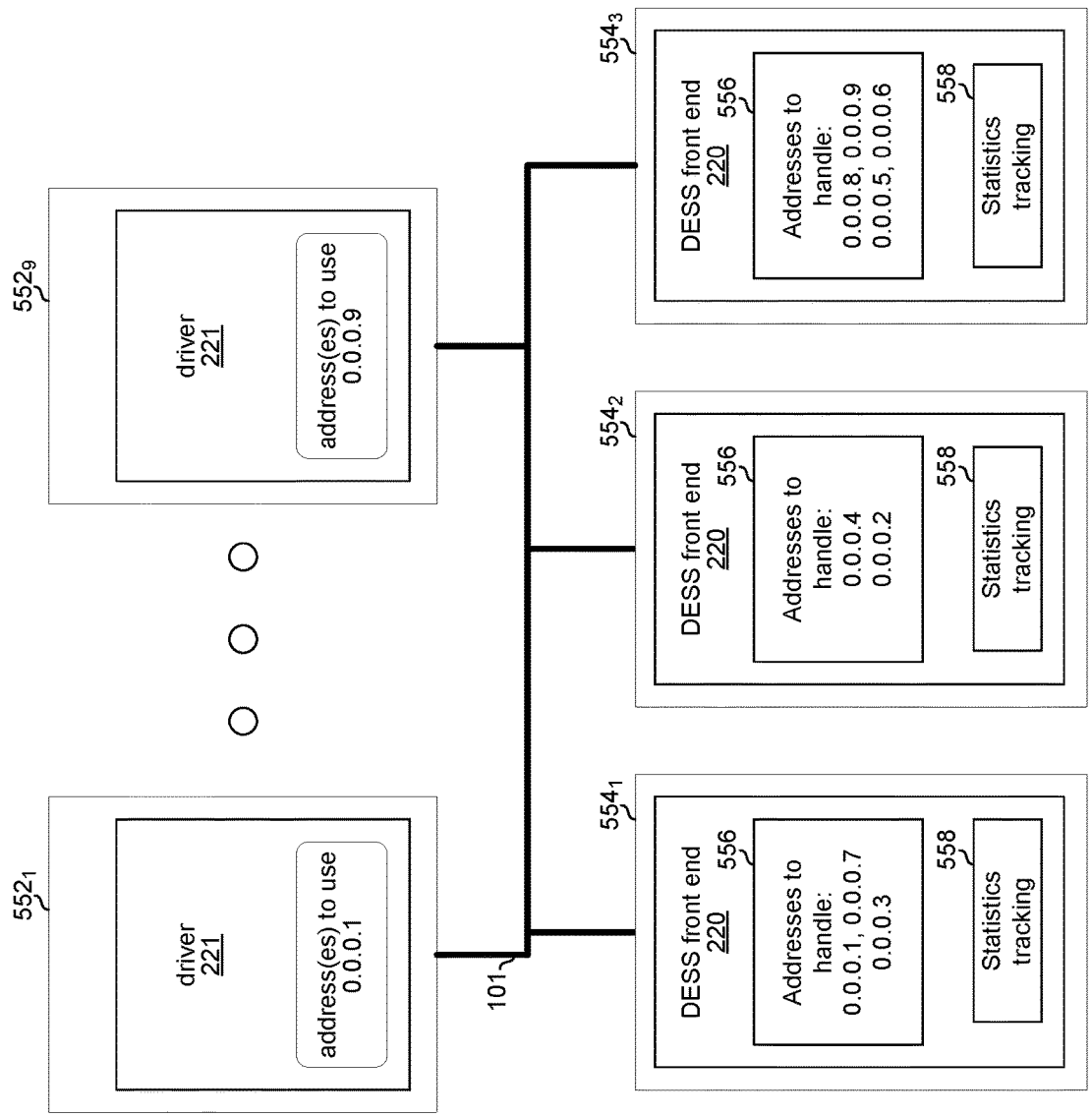

Each of the computing devices 554 comprises an instance of DESS front end 220. Each instance of the DESS front end 220 is configured to serve any file systems requests received via interconnect 101 that are destined for the network addresses stored in its respective memory location 556. Also, each instance of the DESS front end 220 is configured to track statistics, in a respective memory location 558, regarding file systems requests that it serves. The statistics may comprise, for example: count of file system requests destined, during a determined time interval, to each of the network addresses in its memory location 556, count of bits (e.g., total and/or average) sent, during a determined time interval, to and/or from each of the network addresses in its memory location 556, amount of time (e.g., total and/or average milliseconds) to serve received file system requests, and/or the like. FIG. 5B depicts the network before a failure condition, FIG. 5C depicts the network during the failure condition, and FIG. 5D depicts the network after the failure condition.

Returning to FIG. 5A, the process begins in block 502 in which a set of network addresses is allocated for use as the destination addresses of file system requests. In the example of FIG. 5B, the allocated addresses are IPv4 addresses 0.0.0.1 to 0.0.0.9.

In block 504, a unique subset of multiple of the IP addresses is allocated to each of a plurality of computing devices that will operate to serve file system requests. In the example of FIG. 5B, IPv4 addresses 0.0.0.1 to 0.0.0.3 are allocated to device $554_1$, IPv4 addresses 0.0.0.4 to 0.0.0.6 are allocated to device $554_2$, and IPv4 addresses 0.0.0.7 to 0.0.0.9 are allocated to device $554_3$.

In block 506, each client device that will issue network file system requests is assigned or selects one or more IP addresses from the set. The assignment may, for example, comprise manual configuration by a network administrator or automatic configuration by the devices themselves and/or a device operating as a management entity (e.g., a router to which the devices $552_1$-$552_9$ are connected). In the example of FIG. 5B, each of devices $552_1$-$552_9$ is assigned a respective one of IPv4 addresses 0.0.0.1 to 0.0.0.9.

In block 508, the client devices transmit file system requests using their respective one or more of the IP addresses. In the example of FIG. 5B, each of devices $552_1$-$552_3$ transmits file system requests to a respective one of addresses 0.0.0.1-0.0.0.3 and the requests are served by device $554_1$, each of devices $552_4$-$552_6$ transmits file system requests to a respective one of addresses 0.0.0.4-0.0.0.6 and the requests are served by device $554_2$, and each of devices $552_7$-$552_9$ transmits file system requests to a respective one of addresses 0.0.0.7-0.0.0.9 and the requests are served by device $554_3$. Each of the devices $554_1$-$554_3$ maintains statistics regarding the files system requests that it serves.

In block 510, a network event occurs which triggers load balancing. Example network events include: loss of a device (e.g., due to failure or simple removal from the network), a recovery of a previously failed device, an addition of a device to the network, a lapse of a determined time interval, a detection of an imbalance in the load imposed on the devices 554 by file system requests, number of file requests per time interval going above or falling below a threshold, and/or the like. In the example of FIG. 5C, the network event is a failure of device $554_2$.

In block 512, the statistics regarding the network addresses are used to distribute the failed server's subset of the network addresses among the remaining servers in an effort to evenly distribute the failed server's load among the remaining servers. In the example of FIG. 5C, the statistics indicate the load on IP address 0.0.0.4 is larger than the load on IP addresses 0.0.0.5 and 0.0.0.6 (i.e., client $552_4$ is generating more file system traffic than clients $552_5$ and $552_6$). Accordingly, to redistribute the load as evenly as possible, 0.0.0.4 is reassigned to device $554_1$ and addresses 0.0.0.5 and 0.0.06 are reassigned to device $554_3$. Thus, the fact that device $554_2$ served multiple network addresses enables redistributing its load among multiple other devices 554 in manner that is transparent to the client devices $552_1$-$552_9$.

In block 514, a network event occurs which triggers load balancing. In the example of FIG. 5D, the event is the recovery of device $554_2$ such that it is ready to again begin serving file system requests.

In block 516, the statistics regarding the network addresses are used to offload some of the network addresses to the recovered or newly added server in an effort to evenly distribute the load of file system requests among the servers. In the example of FIG. 5D, the statistics indicate that the most even distribution is to reassign 0.0.0.4 and 0.0.0.7 to device $554_2$.

The reassignment may comprise, for example, ranking the loads on all the IP addresses and then using the ranking to assign network addresses in an effort to distribute the load as evenly as possible. In FIG. 5D, for example, the ranking may be 0.0.0.4>0.0.0.1>0.0.0.8>0.0.0.2>0.0.0.9>0.0.0.3> 0.0.0.5>0.0.0.6>0.0.0.7. In some instances, such as in FIG. 5D, the different servers may be assigned different numbers of network addresses in order to more uniformly distribute the load.

As just one example of method for (re)assignment of network addresses, the (re)assignment may comprise assigning a weight to the load on each network address and such that the total load assigned to each server is as uniform as possible. For example, the normalized loads may be as shown in the following table:

| Ranked IP address | Normalized load |
| --- | --- |
| 0.0.0.4 | 4 |
| 0.0.0.1 | 3.5 |
| 0.0.0.8 | 3.2 |
| 0.0.0.2 | 2.1 |
| 0.0.0.9 | 2 |
| 0.0.0.3 | 1.8 |
| 0.0.0.5 | 1.3 |
| 0.0.0.6 | 1.1 |
| 0.0.0.7 | 1 |

The total load is then 4+3.5+3.2+2.1+2+1.8+1.3+1.1+1=20 and thus the redistribution may seek to assign each server a normalized load that is as close as possible to 20/3=6.67. For the example values in the table, this may result in an assignment of 0.0.0.4, 0.0.0.3, 0.0.0.7 (total normalized load of 6.8) to a first one of the servers, 0.0.0.8, 0.0.0.2, 0.0.0.5 (total normalized load of 6.6) to a second one of the servers, and 0.0.0.1, 0.0.0.9, 0.0.0.6 (total normalized load of 6.6) to a third one of the servers.

In an example implementation the (re)assignment of network addresses may take into account the available resources of the various servers. That is, a first server may have more available resources (e.g., processor cycles, network bandwidth, memory, etc.) than a second server and thus the first server may be assigned a larger percentage of the file system request load than the second server. For example, again using the example from the table above, if one of the servers can handle twice the load as each of the other two servers, then the first may be assigned a total normalized load close to 10 (e.g., 0.0.0.4, 0.0.0.1, 0.0.0.6, 0.0.0.7 for a total of 9.9) while each of the other two is assigned a load close to 5 (e.g., 0.0.0.8, 0.0.0.3 for a total of 5, and 0.0.0.2, 0.0.0.9, 0.0.0.y for a total of 5.1).

In parallel with blocks 508-516, are blocks 518 and 520 which may, for example, run continually or periodically as a background process. In block 518, each server tracks statistics regarding each IP address of its subset of the IP addresses. In block 520, the statistics generated in block 518 are distributed among the servers and/or provided to a coordinator device (e.g., one of the servers elected as coordinator through some voting process or other selection algorithm) such that the statistics of all the servers are available for performing reassignment of network addresses.

Figure 6A:
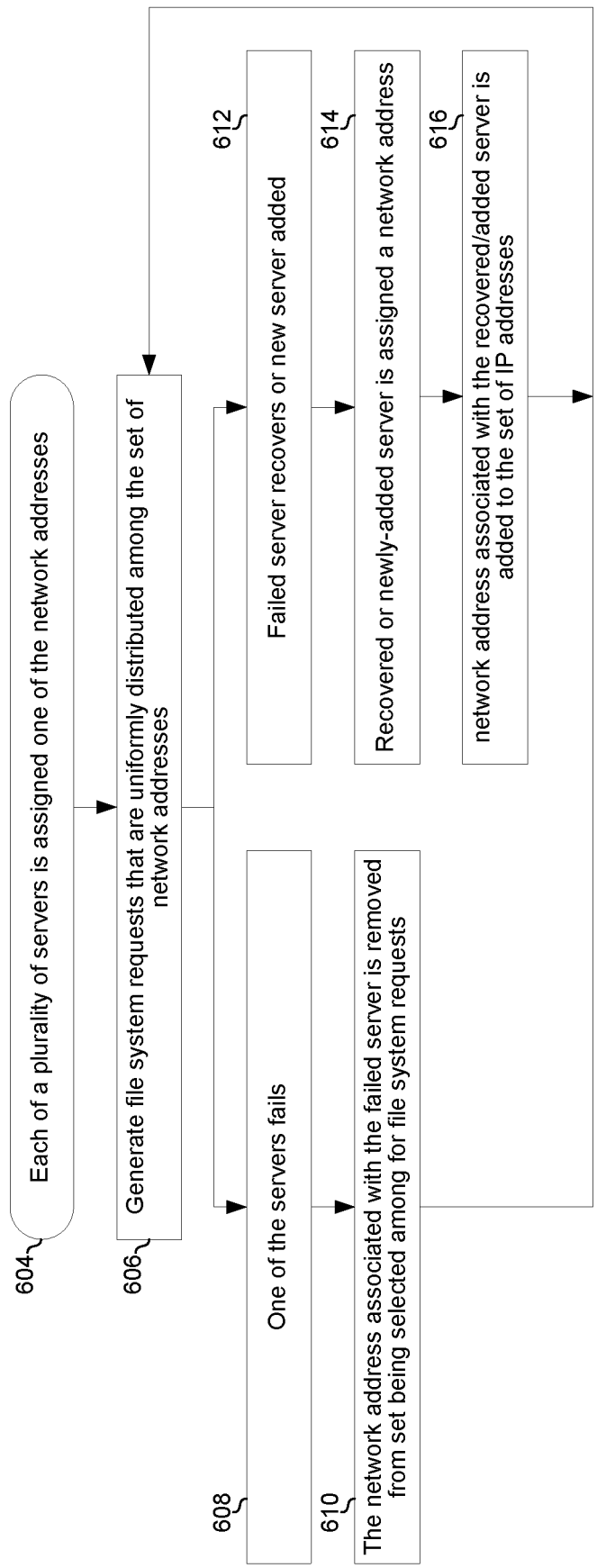
FIG. 6A is a flowchart of an example process for load balancing the handling of file system requests in accordance with aspects of this disclosure.
Figure 6B:
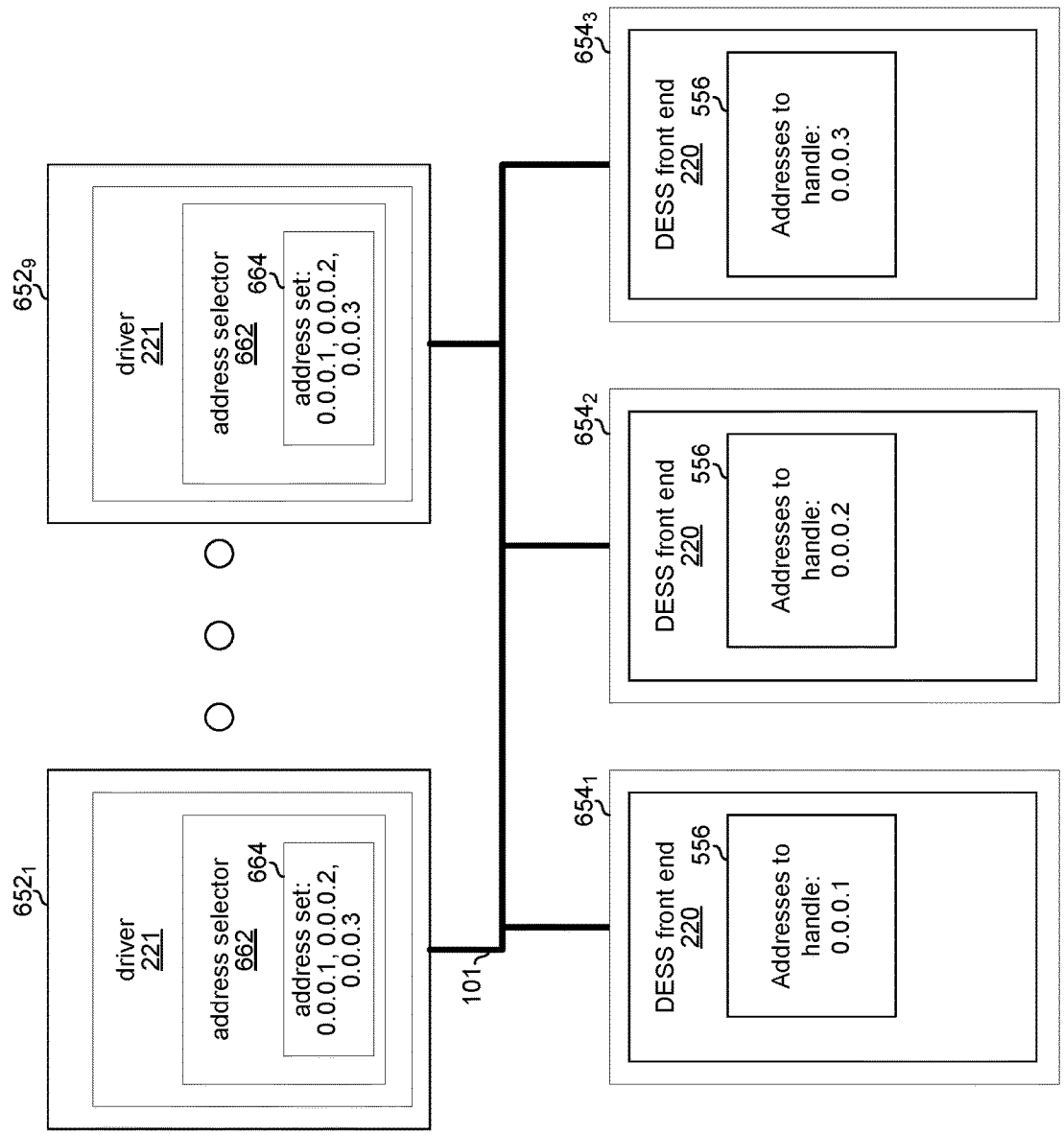
FIG. 6B-6C illustrate an example DESS during the process of FIG. 6A.
Figure 6C:
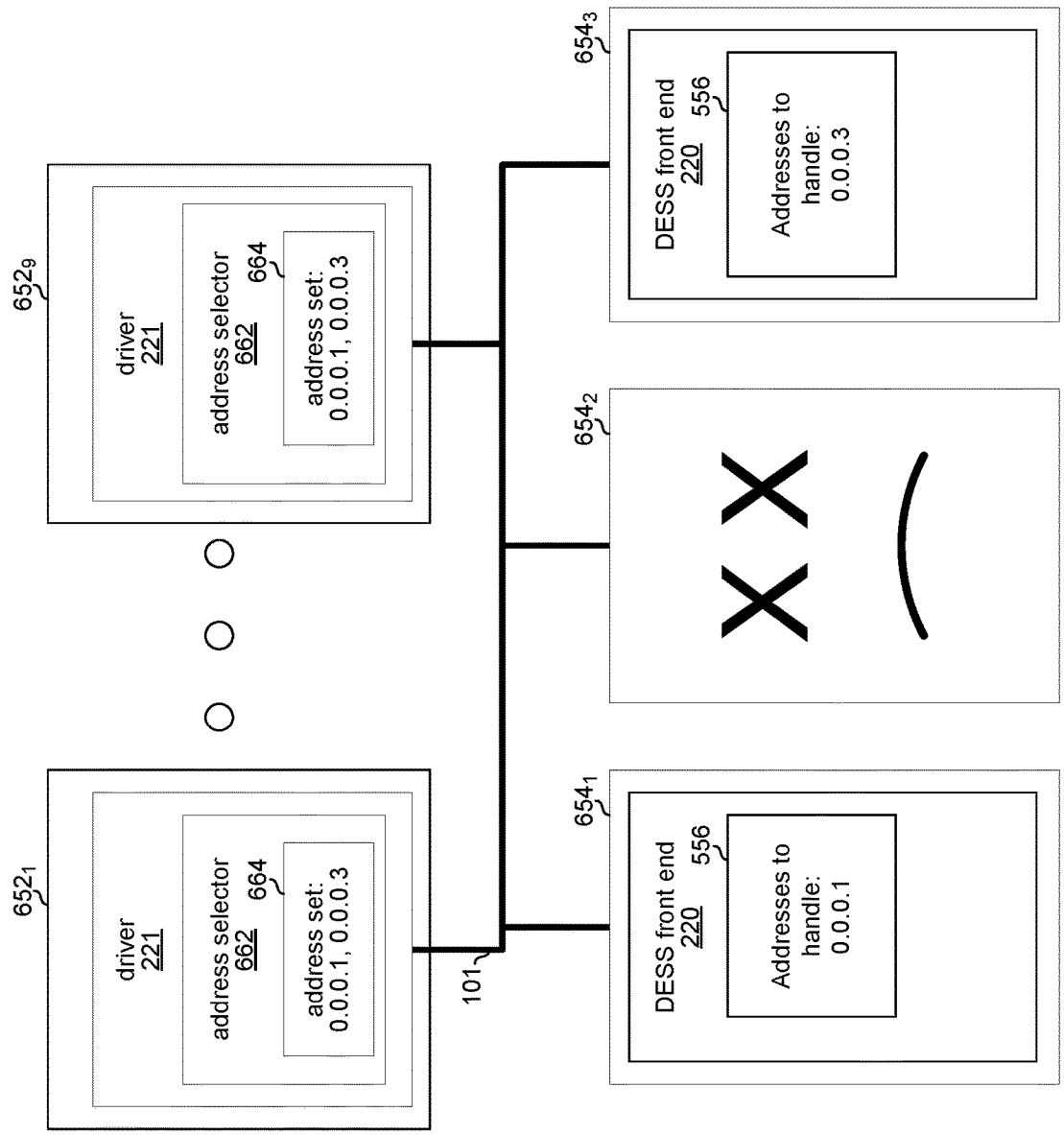

FIG. 6A is a flowchart of an example process for load balancing the handling of file system requests in accordance with aspects of this disclosure. The process is described with reference to FIGS. 6B-6C which depict a plurality (three in the non-limiting example shown) of computing devices 654 which operate as file system servers to server file system requests transmitted over the interconnect 101 by a plurality (nine in the non-limiting example shown) of computing devices 652 which operate as file system clients. FIG. 6B illustrates the network before and after a device failure and FIG. 6C shows the network during a failure condition.

Each of the computing devices 652 comprises an instance of driver 221. Each instance of driver 221 is configured to send file system requests (e.g., transmitted in accordance with NFS and/or SMB standards) to a network address selected by its address selector circuitry 662. The address selector 662 may select from the set of addresses in its memory 664. The address selector 662 may sequentially cycle through the set of addresses in its memory 664, or may randomly select from among the set of addresses in its memory 664 such that requests are uniformly distributed among the network addresses. A new address may, for example, be selected periodically, prior to each file system request to be sent, every Nth (N being an integer) file system request, and/or the like.

Each of the computing devices 654 comprises an instance of DESS front end 220. Each instance of the DESS front end 220 is configured to serve any file systems requests received via interconnect 101 that are destined for the network addresses stored in its respective memory location 556.

Returning to FIG. 6A, the process begins in block 604 in which each of a plurality of computing devices that will serve file system requests is assigned a network addresses. In the example of FIG. 6B, device $654_1$ is assigned to handle file system requests destined for 0.0.0.1, device $654_2$ is assigned to handle file system requests destined for 0.0.0.2, and device $654_3$ is assigned to handle file system requests destined for 0.0.0.3.

In block 606, the client devices begin transmitting file system requests onto the interconnect 101 with the destinations addresses of the requests being uniformly distributed among the network addresses in the set of network addresses.

Blocks 608 and 610 represent one possible sequence of events after block 606 and blocks 612-616 represent another possible sequence of events after block 606.

In block 608, one of the devices serving the file system requests fails. In the example of FIG. 6C, the device $654_2$ fails.

In block 610, the network address assigned to the failed device is removed from (or flagged as "do not use" in) the set of network addresses from which the address selectors 662 are selecting addresses for file system requests. Thus, in the example of FIG. 6C, IPv4 address 0.0.0.2 associated with failed device $654_2$ is removed from each of the memory locations 664.

In block 612, the failed device recovers or a new device for serving file system requests is added. In the example of FIG. 6B, server $654_2$ recovers and is ready to again begin serving file system requests.

In block 614, the recovered device is assigned a network address. In the example of FIG. 6B, the device $654_2$ is again assigned 0.0.0.2.

In block 616, the network address assigned to the recovered or newly-added computing device is added to the set from which the address selectors 662 are selecting addresses for file system requests. Thus, in the example of FIG. 6B, IPv4 address 0.0.0.2 associated with new or recovered device 654$_2$ is added to the set in each of the memory locations 664.

Figure 7A:
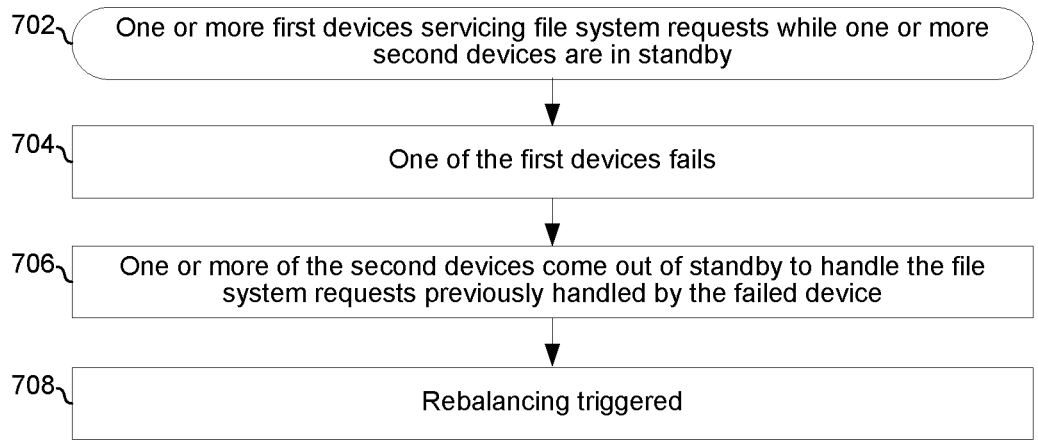
FIG. 7A is a flowchart of an example process for handling of file system requests in accordance with aspects of this disclosure.
Figure 7B:
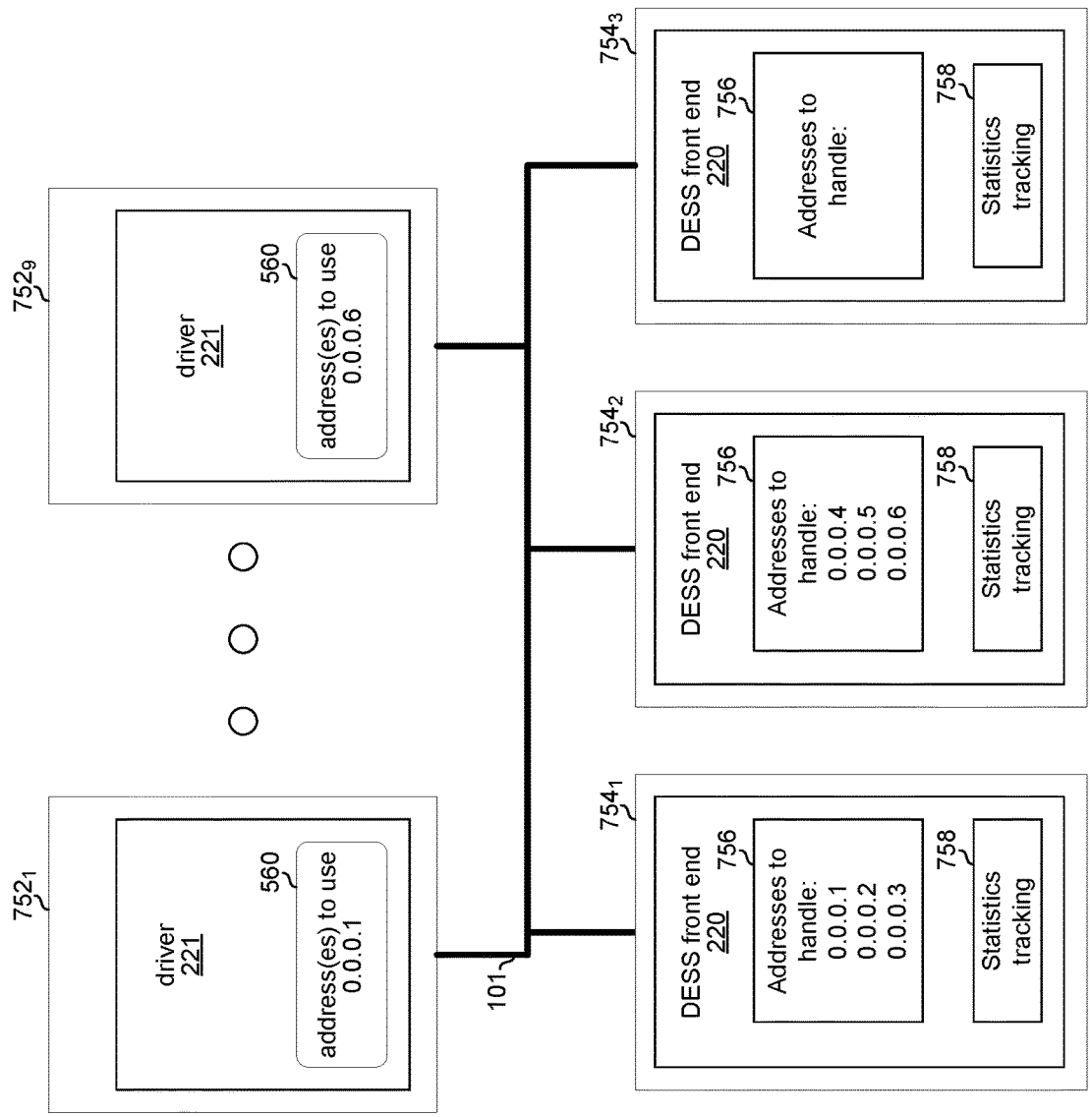
FIG. 7B-7C illustrate an example DESS during the process of FIG. 7A.
Figure 7C:
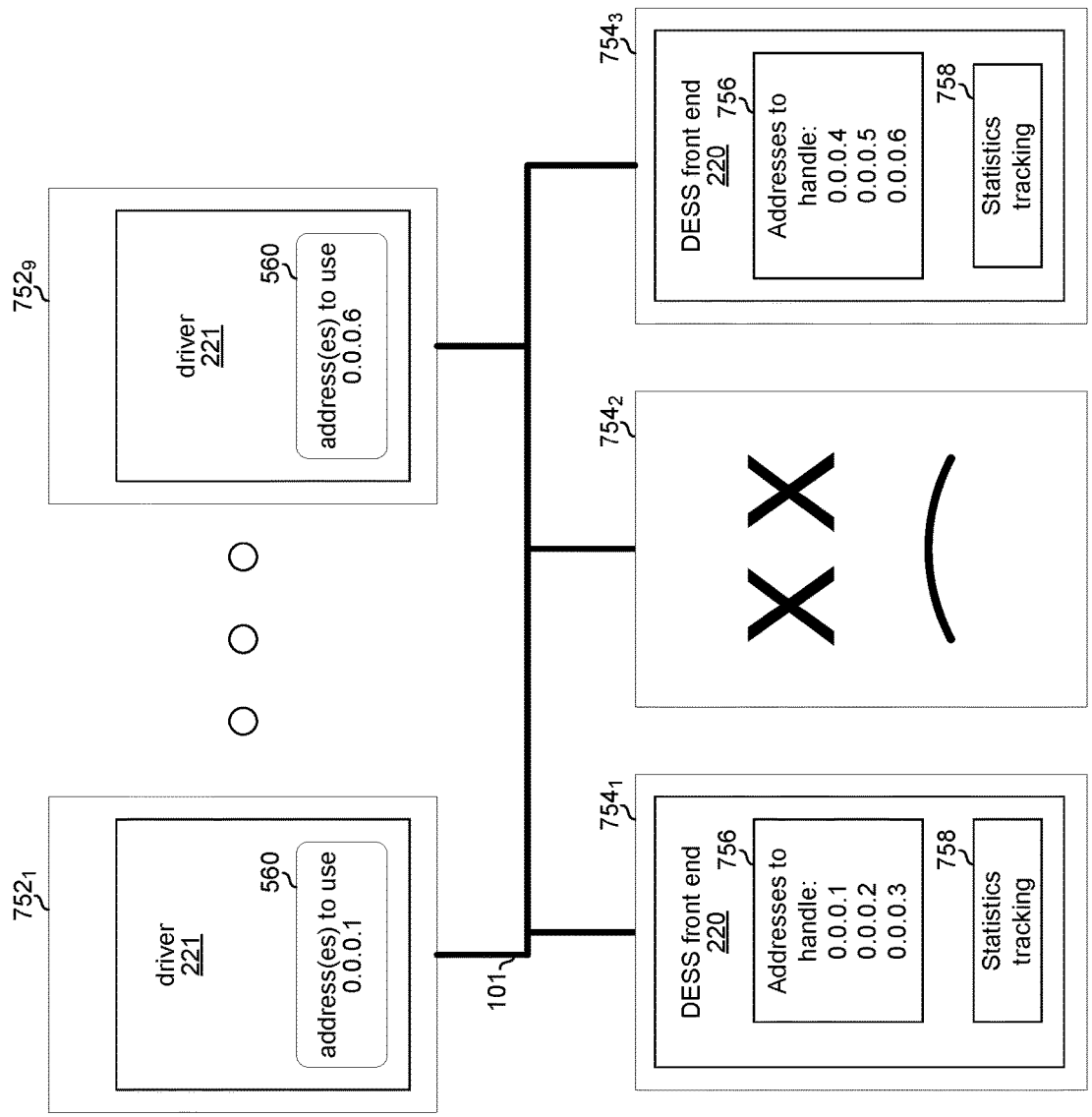

FIG. 7A is a flowchart of an example process for handling of file system requests in accordance with aspects of this disclosure. In block 702, one or more first devices are servicing file system requests while one or more second devices are in standby. In the example of FIGS. 7B, devices 754$_1$ and 754$_2$ are servicing file system requests while 754$_3$ is in standby. In block 704, one of the first devices fails. In the example of FIG. 7C, device 754$_2$ fails. In block 706, one or more of the second devices come out of standby to handle the file system requests previously handled by the failed device. In the example of FIG. 7C, the device 754$_3$ comes out of standby and takes over the IP addresses that were being handled by the failed device 754$_2$. In block 708, rebalancing triggered as a result of, for example, the device 754$_3$ having different available resources than the device 754$_2$. The rebalancing may, for example, result in some of the addresses being shifted from device 754$_1$ to 754$_3$, or visa-versa. Where devices 754$_2$ and 754$_3$ are identical, for example, such rebalancing may be unnecessary.

Figure 8A:
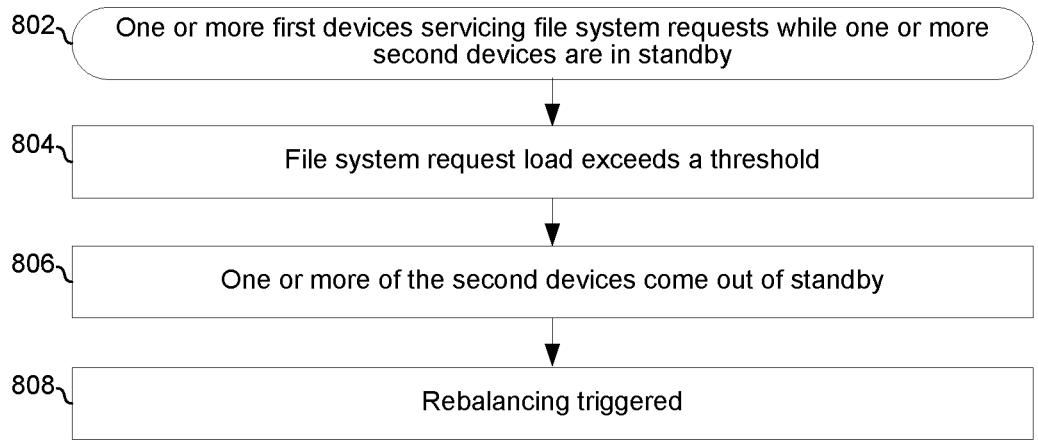
FIG. 8A is a flowchart of an example process for load balancing the handling of file system requests in accordance with aspects of this disclosure.
Figure 8B:
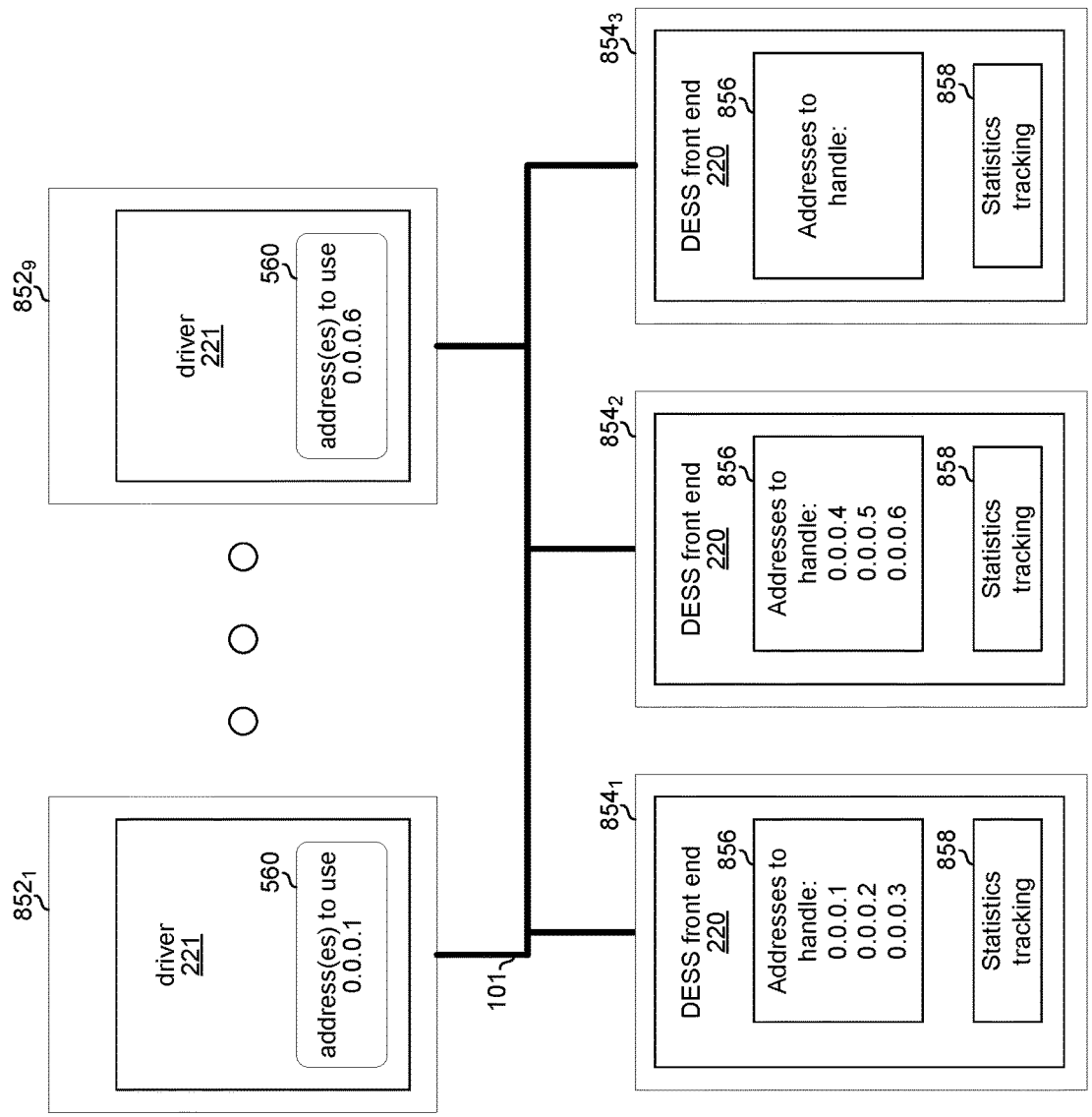
FIG. 8B-8C illustrate an example DESS during the process of FIG. 8A.
Figure 8C:
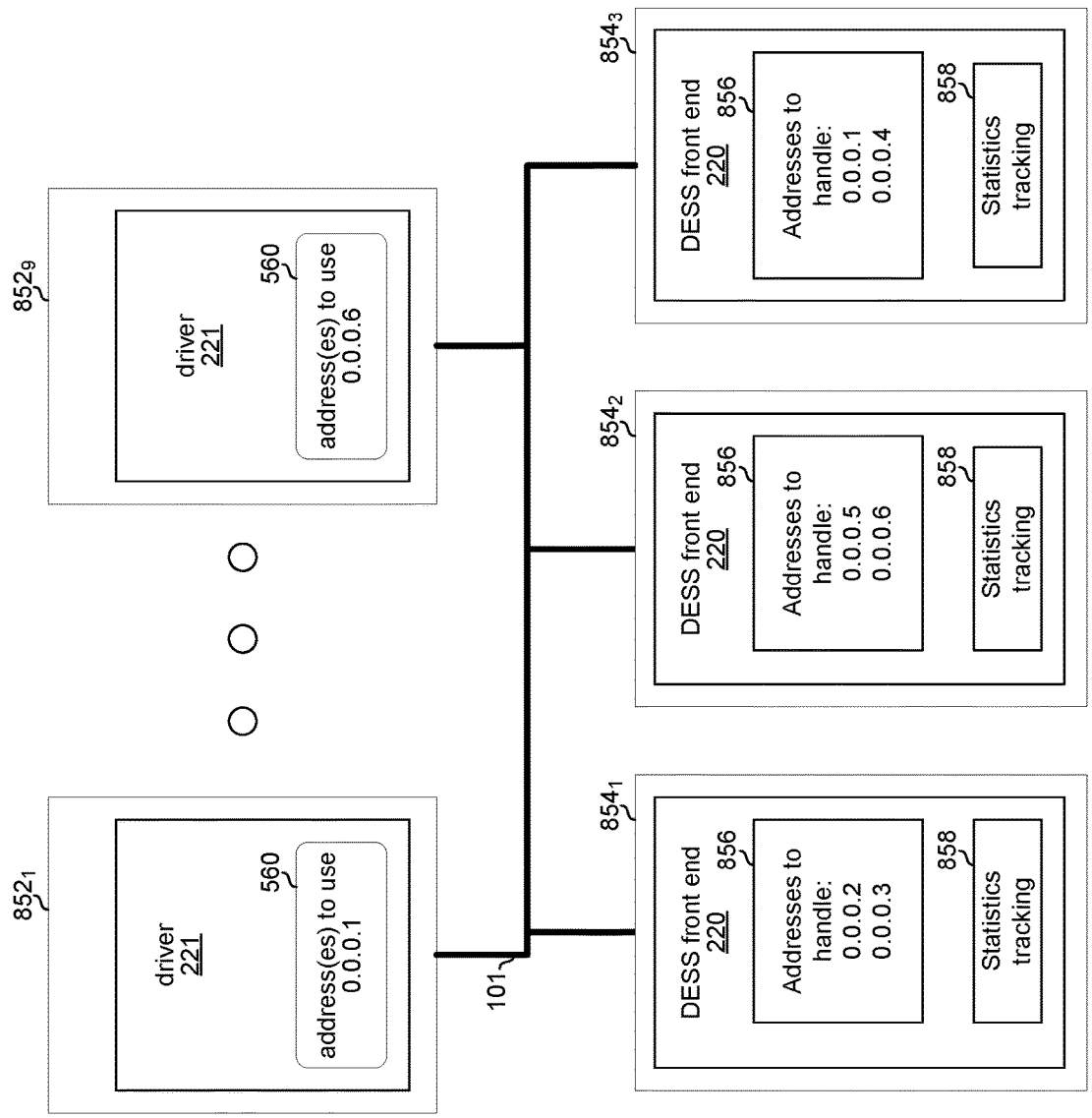

FIG. 8A is a flowchart of an example process for load balancing the handling of file system requests in accordance with aspects of this disclosure. In block 802, one or more first devices are servicing file system requests while one or more second devices are in standby. In the example of FIG. 8B, devices 854$_1$ and 854$_2$ are servicing file system requests while 854$_3$ is in standby. In block 804, the file system request load on the devices (e.g., measured in terms of number of file system requests per time interval, number of currently pending file system requests, average time for one or more of the devices 854 to service a file system request, and/or the like) exceeds a threshold. In block 806, one or more of the second devices come out of standby. In the example of FIGS. 8C, the device 854$_3$ comes out of standby. In block 808, rebalancing triggered and the network addresses are redistributed among the devices including the device(s) which came out of standby. In the example of FIGS. 8C, the load balancing results in device 854$_1$ handling addresses 0.0.0.2 and 0.0.0.3, device 854$_2$ handling addresses 0.0.0.5 and 0.0.0.6, and device 854$_3$ handling address 0.0.0.1 and 0.0.0.4.

In accordance with an example implementation of this disclosure, a system comprises a plurality of computing devices (e.g., 552$_1$-552$_9$, 554$_1$-554$_3$, and/or one or more devices (e.g., router) of interconnect 101) and control circuitry (e.g., hardware 202 and associated software and/or firmware of one or more of the devices 554$_1$-554$_3$, and/or hardware and associated software and/or firmware of a device (e.g., router) of interconnect 101). The control circuitry is operable to: assign, prior to a network event, a first plurality of IP addresses of a set of IP addresses to a first server of the plurality of computing devices such that file system requests destined to any of the first plurality of IP addresses are to be served by the first server; assign, prior to the network event, a second plurality of IP addresses of the set of IP addresses to a second server of the plurality of computing devices such that file system requests destined to any of the second plurality of IP addresses are to be served by the second server; and assign, prior to the network event, a third plurality of IP addresses of the set of IP addresses to a third server of the plurality of computing devices such that file system requests destined to any of the third plurality of the IP addresses are to be served by the third server. The control circuitry is operable to maintain statistics regarding file system requests sent to each IP address of the set of IP addresses. The control circuitry is operable to determine, based on the statistics, a first portion of the first plurality of IP addresses to reassign to the second server and a second portion of the first plurality of IP addresses to reassign to the third server. The control circuitry is operable to reassign, subsequent to the network event, the first portion of the first plurality of IP addresses to the second server such that file system requests destined to any of the first portion of the first plurality of IP addresses are to be served by the second server. The control circuitry is operable to reassign, subsequent to the network event, a second portion of the first plurality of IP addresses to the third server such that file system requests destined to any of the second portion of the first plurality of IP addresses are to be served by the third server, wherein the reassignment is based on the statistics.

In accordance with an example implementation of this disclosure, a system comprises a plurality of computing devices (e.g., 552$_1$-552$_9$, 554$_1$-554$_3$, and/or one or more devices (e.g., router) of interconnect 101) and control circuitry (e.g., hardware 202 and associated software and/or firmware of one or more of the devices 554$_1$-554$_3$, and/or hardware and associated software and/or firmware of a device (e.g., router) of interconnect 101). The control circuitry is operable to assign a first of the computing devices (e.g., 554$_1$) to serve file system requests destined for any of a first plurality of network addresses; assign a second of the computing devices (e.g., 554$_2$) to serve file system requests destined for any of a second plurality of network addresses; maintain statistics regarding file system requests sent to each of the first plurality of network addresses and the second plurality of network addresses; and reassign, based on the statistics, the first of the computing devices to serve file system requests destined for a selected one of the second plurality of network addresses. The plurality of computing devices may comprise a plurality of third computing devices (e.g., 552$_1$-552$_9$), each of which is assigned to send its file system requests to a respective one of the first plurality of network addresses and the second plurality of network addresses. The plurality of computing devices may comprise a plurality of third computing devices (e.g., 552$_1$-552$_9$) operable to generate a plurality of file system requests, wherein destination network addresses of the plurality of file system requests are uniformly distributed among the first plurality of network addresses.

Thus, the present methods and systems may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable medium (e.g., FLASH drive(s), optical disk(s), magnetic storage disk(s), and/or the like) having stored thereon one or more lines of code executable by a computing device, thereby configuring the machine to be configured to implement one or more aspects of the virtual file system described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise first "circuitry" when executing a first one or more lines of code and may comprise second "circuitry" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

What is claimed is:

1. A system comprising:
a first computing device configured to serve a file system request to any of a first plurality of IP addresses;
a second computing device configured to serve a file system request to any of a second plurality of IP addresses, wherein a front end of the second computing device is configured to track statistics regarding file systems requests that the second computing device serves, and wherein the second plurality of IP addresses are unique with respect to the first plurality of IP addresses;
a third computing device configured to serve a file system request to any of a third plurality of IP addresses; and
a device coordinator configured to, after a network event:
reassign the second computing device to serve file system requests destined for a first portion of the first plurality of IP addresses, wherein the reassignment is according to respective loads on the first plurality of IP addresses, and
reassign the third computing device to serve file system requests destined for a second portion of the first plurality of IP addresses, wherein the first plurality of IP addresses are distributed between the first portion and the second portion to achieve load balancing.

2. The system of claim 1, wherein the network event is a failure of the first computing device.

3. The system of claim 1, wherein the network event is a lapse of a determined time interval.

4. The system of claim 1, wherein the network event is detection of a load imbalance among the first computing device and the second computing device.

5. The system of claim 1, wherein the statistics comprise, for each IP address of the third plurality of IP addresses, a count of how many of the file system requests are sent to the IP address.

6. The system of claim 1, wherein the statistics comprise a count of a number of bits sent to or from an IP address.

7. The system of claim 1, wherein the statistics comprise an indication of an amount of time required to serve a file system request sent to an IP address.

8. The system of claim 1, wherein the reassignment is based on a goal of uniform distribution of file system requests.

9. The system of claim 1, wherein the device coordinator comprises one or more network adaptors.

10. The system of claim 1, wherein the first computing device is a virtual machine.

11. A method comprising:
serving, via a first computing device, a file system request to any of a first plurality of IP addresses;
serving, via a second computing device, a file system request to any of a second plurality of IP addresses;
tracking, via a front end of the second computing device, statistics regarding file systems requests that the second computing device serves, wherein the second plurality of IP addresses are unique with respect to the first plurality of IP addresses;
serving, via a third computing device, a file system request to any of a third plurality of IP addresses;
after a network event, reassigning, via a device coordinator, the second computing device to serve file system requests destined for a first portion of the first plurality of IP addresses, wherein the reassignment is according to respective loads on the first plurality of IP addresses; and
after the network event, reassigning, via the device coordinator, the third computing device to serve file system requests destined for a second portion of the first plurality of IP addresses, wherein the first plurality of IP addresses are distributed between the first portion and the second portion to achieve load balancing.

12. The method of claim 11, wherein the network event is a failure of the first computing device.

13. The method of claim 11, wherein the network event is a lapse of a determined time interval.

14. The method of claim 11, wherein the network event is detection of a load imbalance among the first computing device and the second computing device.

15. The method of claim 11, wherein the statistics comprise, for each IP address of the third plurality of IP addresses, a count of how many of the file system requests are sent to the IP address.

16. The method of claim 11, wherein the statistics comprise a count of a number of bits sent to or from an IP address.

17. The method of claim 11, wherein the statistics comprise an indication of an amount of time required to serve a file system request sent to an IP address.

18. The method of claim 11, wherein the reassignment is based on a goal of uniform distribution of file system requests.

19. The method of claim 11, wherein the device coordinator comprises one or more network adaptors.

20. The method of claim 11, wherein the first computing device is a virtual machine.

* * * * *